(12) United States Patent
Liu et al.

(10) Patent No.: US 12,393,088 B2
(45) Date of Patent: Aug. 19, 2025

(54) FLASH LAMP, FLASH LAMP CONTROL METHOD AND MOBILE EQUIPMENT

(71) Applicant: GUANGDONG OPPO MOBILE TELECOMMUNICATIONS CORP., LTD., Guangdong (CN)

(72) Inventors: Wei Liu, Guangdong (CN); Qing Xiao, Guangdong (CN); Zheng Liu, Guangdong (CN); Guangwen Wu, Guangdong (CN); Dandan Su, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 586 days.

(21) Appl. No.: 17/857,704

(22) Filed: Jul. 5, 2022

(65) Prior Publication Data
US 2022/0334447 A1    Oct. 20, 2022

Related U.S. Application Data

(63) Continuation of application No. PCT/CN2020/140679, filed on Dec. 29, 2020.

(30) Foreign Application Priority Data

Jan. 6, 2020 (CN) .......................... 202010011552.8

(51) Int. Cl.
G02F 1/163 (2006.01)
F21V 14/00 (2018.01)
G02F 1/1506 (2019.01)
G02F 1/1514 (2019.01)
(Continued)

(52) U.S. Cl.
CPC ............ *G02F 1/163* (2013.01); *F21V 14/003* (2013.01); *G02F 1/1508* (2013.01); *G02F 1/1514* (2019.01); *G02F 1/157* (2013.01); *G03B 15/05* (2013.01)

(58) Field of Classification Search
None
See application file for complete search history.

(56) References Cited

U.S. PATENT DOCUMENTS

2010/0124041 A1    5/2010  Druchinin
2013/0314919 A1*  11/2013  Chung .................... F21S 10/02
                                                                    362/236
(Continued)

FOREIGN PATENT DOCUMENTS

CN    102244201 A    11/2011
CN    102998875 A    3/2013
(Continued)

OTHER PUBLICATIONS

Chinese First Office Action with English Translation for CN Application 202010011552.8 mailed Oct. 21, 2021. (16 pages).
(Continued)

*Primary Examiner* — Phu Vu
(74) *Attorney, Agent, or Firm* — Young Basile Hanlon & MacFarlane, P.C.

(57) ABSTRACT

A flash lamp, a flash lamp control method and a mobile device are described. The flash lamp includes a light-emitting device and an electrochromic module disposed on the light-emitting device. A color of the electrochromic module is different under different operating voltages, such that a color temperature of light is different, the light being emitted by the light-emitting device and passing through the electrochromic module.

17 Claims, 5 Drawing Sheets

(51) Int. Cl.
     *G02F 1/157*   (2006.01)
     *G03B 15/05*   (2021.01)

(56)            References Cited

U.S. PATENT DOCUMENTS

2015/0015721 A1*  1/2015  Fan .................. H04N 23/74
                                              348/222.1
2017/0155811 A1*  6/2017  Jagt .................. F21V 9/38

FOREIGN PATENT DOCUMENTS

CN      202884805 U    4/2013
CN      103838062 A    6/2014
CN      104280979 A    1/2015
CN      104614918 A    5/2015
CN      107037659 A    8/2017
CN      109040570 A   12/2018
CN      109982532 A    7/2019
WO      2021136091 A1  7/2021

OTHER PUBLICATIONS

Chinese Notification to grant patent right for invention with English Translation for CN Application 202010011552.8 mailed Jan. 10, 2022. (7 pages).
International Written Opinion with English Translation for PCT Application PCT/CN2020/140679 mailed Feb. 26, 2021. (13 pages).
Extended European Search Report for Application No. 20912211.8 mailed Dec. 22, 2022 (7 pages).

* cited by examiner

FLASH LAMP, FLASH LAMP CONTROL METHOD AND MOBILE EQUIPMENT

CROSS-REFERENCE TO RELATED APPLICATION(S)

The present application is a continuation-application of International (PCT) Patent Application No. PCT/CN2020/140679, filed on Dec. 29, 2020, which claims priority of Chinese Patent Application No. 202010011552.8, filed on Jan. 6, 2020, the entire contents of both of which are hereby incorporated by reference.

TECHNICAL FIELD

The present disclosure relates to the field of terminal technologies, and in particular to a flash lamp, a flash lamp control method and a mobile equipment.

BACKGROUND

In a process of taking pictures, in order to obtain better photo effect, a flash lamp will be used to fill light usually in low light conditions, etc. When the color temperature of the flash lamp is the same as the environmental color temperature, the effect of the taken picture is closest to actuality. Therefore, in many scenes, the color temperature of the flash lamp is usually adjusted to get an image closer to an actual effect.

At present, the color temperature adjustment scheme of flash lamp is to apply two or more different color temperature light-emitting devices to combine into the flash lamp, and change the light-emitting color of the flash lamp by controlling the combination of different light-emitting devices in the flash lamp. However, the debugging process of the flash lamp is complex and not easy to operate.

SUMMARY

One of the objectives of the present disclosure is to provide a flash lamp. The flash lamp includes a light-emitting device and an electrochromic module disposed on the light-emitting device; wherein a color of the electrochromic module is different under different operating voltages, such that a color temperature of light is different, the light being emitted by the light-emitting device and passing through the electrochromic module.

Another of the objectives of the present disclosure is to provide a method for controlling a flash lamp; wherein the flash lamp includes: a light-emitting device and an electrochromic module disposed on the light-emitting device; a color of the electrochromic module is different under different operating voltages, such that a color temperature of light is different, the light being emitted by the light-emitting device and passing through the electrochromic module; the method includes: obtaining a target color temperature; determining a target electrochromic voltage corresponding to the target color temperature according to a corresponding relationship between the color temperature of the light and an electrochromic voltage of the electrochromic module; and controlling an operating voltage of the electrochromic module according to the target electrochromic voltage, such that the color temperature of the light tends to the target color temperature.

Another of the objectives of the present disclosure is to provide an electronic equipment, including an image obtaining device and a flash lamp; wherein the flash lamp includes: a light-emitting device and an electrochromic module disposed on the light-emitting device; a color of the electrochromic module is different under different operating voltages, such that a color temperature of light is different, the light being emitted by the light-emitting device and passing through the electrochromic module.

BRIEF DESCRIPTION OF DRAWINGS

In order to explain the technical solutions of the embodiments of the present disclosure more clearly, the following briefly introduces the accompanying drawings required for the description of the embodiments. It should be understood that the following drawings only illustrate certain embodiments of the present disclosure and therefore should not be regarded as limiting the scope, and that other relevant drawings may be obtained by those skilled in the art without creative effort.

Figure 1:
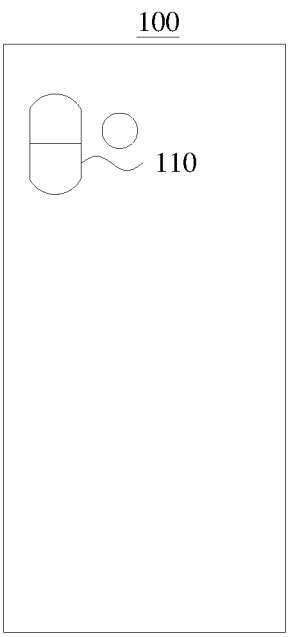
FIG. 1 is a structural schematic view of a conventional flash lamp.

Reference numerals: 100, mobile equipment; 110, light-emitting assembly; 200, flash lamp; 210, light-emitting device; 220, electrochromic module; 221, first electrochromic device; 222, second electrochromic device; 230, lamp shade; 240, protective cover plate; 250, transparent adhesive layer; 2201, conductive layer; 2202, electrochromic layer; 2203, electrolyte layer; 2204, ion storage layer; 300, control unit; 400, data processing unit.

DETAILED DESCRIPTION

In order to make the purpose, technical solutions and advantages of the embodiments of the present disclosure clearer, the technical solutions in the embodiments of the present disclosure will be described clearly and completely in conjunction with the accompanying drawings in the embodiments of the present disclosure. Obviously, the described embodiments are a part of the embodiments of the present disclosure, but not all of the embodiments. The components of the embodiments of the present disclosure generally described and shown in the drawings herein may be arranged and designed in various different configurations.

Therefore, the following detailed description of the embodiments of the present disclosure provided in the accompanying drawings is not intended to limit the scope of the present disclosure, but merely represents selected embodiments of the present disclosure. Based on the embodiments in the present disclosure, all other embodiments obtained by those skilled in the art without creative efforts shall fall within the scope of the present disclosure.

It should be noted that similar reference numerals and letters indicate similar items in the following drawings. Therefore, once a certain item is defined in one drawing, it does not need to be further defined and explained in the subsequent drawings.

In the description of the present disclosure, it should also be noted that the terms "arranged", "installed", "connected", and "coupled" should be understood in a broad sense, unless explicitly specified and limited otherwise. For example, it may be a fixed connection, a removable connection, or a one-piece connection; it may be a mechanical connection or an electrical connection; it may be a direct connection or an indirect connection through an intermediate medium, and it may be a connection within two devices. For those skilled in the art, the specific meaning of the above terms in the present disclosure can be understood in specific cases.

A flash lamp 200 is an indispensable device for conventional terminal equipment. The flash lamp 200 can not only play the role of auxiliary lighting, but most importantly, it can also assist a camera to take pictures and videos in dark light or special scenes, thereby improving the effect of the taken pictures and videos.

Figure 2:
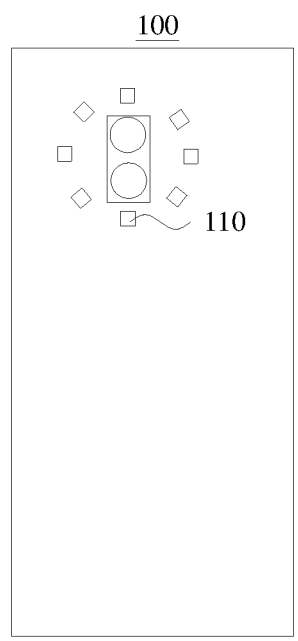
FIG. 2 is a structural schematic view of another conventional flash lamp.

Referring to FIGS. 1 and 2, a conventional mobile equipment 100 is often adopted with a light-emitting assembly 110 on the flash lamp 200 to achieve the purpose of the flash lamp 200 emitting light of different color temperatures. For example, the flash lamp 200 may be a single-color temperature or dual-color temperature flash lamp, or a three-color temperature flash lamp adopted in fewer equipment. The single-color temperature flash lamp is generally implemented with a single or multiple light-emitting devices of the same model, the dual-color temperature flash lamp is generally implemented with two or more light-emitting devices with two color temperatures, and the three-color temperature flash lamp is generally implemented with three light-emitting devices with different color temperatures. In many shooting scenes, the color temperature of the flash lamp is required to change with changes in the environment. In this case, the method of combining multiple light-emitting devices makes the process of controlling the flash lamp very complicated.

In order to solve the above problem, the present disclosure provides a flash lamp control solution.

Figure 3:
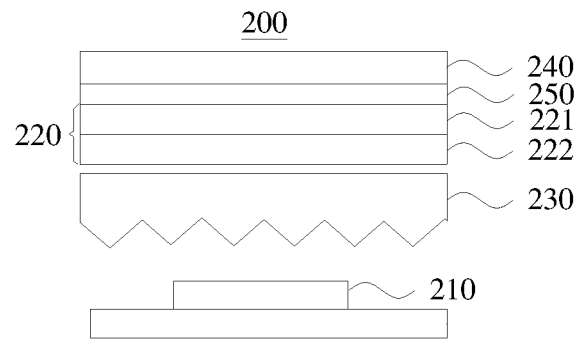
FIG. 3 is a structural schematic view of a flash lamp according to an embodiment of the present disclosure.

Referring to FIG. 3, FIG. 3 is a structural schematic view of a flash lamp 200 according to an embodiment of the present disclosure. The flash lamp 200 includes an electrochromic module 220 disposed on a light-emitting device 210. The color of the electrochromic module 220 is different under different operating voltages, such that the color temperature of the light emitted by the light-emitting device 210 after passing through the electrochromic module 220 is different.

In the embodiments, by arranging the electrochromic module 220 on the light-emitting device 210 of the flash lamp 200, since the electrochromic module 220 has different colors under different operating voltages, the light emitted by the light-emitting device 210 is transmitted can present different color temperatures after passing through the electrochromic module 220. In this way, when adjusting the color temperature of the flash lamp 200, it is not necessary to adjust the light-emitting device 210 of the flash lamp 200, but only needs to control the operating voltage of the electrochromic module 220, which has the feature of convenient adjustment.

Referring to FIG. 3, in some embodiments, the electrochromic module 220 includes a first electrochromic device 221 for adjusting a cold color light and a second electrochromic device 222 for adjusting a warm color light. The first electrochromic device 221 and the second electrochromic device 222 are sequentially arranged on the light-emitting device 210.

In the embodiments, the first electrochromic device 221 can change to a cool color when a voltage is applied, and as the operating voltage across the first electrochromic device 221 increases, the color will gradually become darker. The second electrochromic device 222 can change to a warm color when a voltage is applied, and as the operating voltage across the second electrochromic device 222 increases, the color will gradually become darker. In this way, the arrangement of the two electrochromic devices may realize the change of cold color light and warm color light. When the color temperature of the flash lamp 200 is adjusted, the first electrochromic device 221 or the second electrochromic device 222 may be individually adjusted for controlling, such that the adjustment function is more abundant, and the adjustment is more convenient.

It should be noted that, in the embodiments, there may be multiple first electrochromic devices 221 for adjusting the cold color light, and there may be multiple second electrochromic devices 222 for adjusting the warm color light. Each of the first electrochromic device 221 and the second electrochromic device 222 may be individually controlled.

In some embodiments, the flash lamp 200 further includes a lamp shade 230, and the lamp shade 230 is arranged between the electrochromic module 220, such as the first electrochromic device 221 and the second electrochromic device 222, and the light-emitting device 210.

In the embodiments, the flash lamp 200 is arranged with the lamp shade 230, and a side of the lamp shade 230 close to the light-emitting device 210 is arranged with a pattern. In this way, the lamp shade 230 can form a Fresnel lens, such that the light emitted by the light-emitting device 210 may become uniform and the brightness may be more concentrated after passing through the lamp shade 230. During the installation, the electrochromic module 220 may be installed through a support.

In some embodiments, the flash lamp 200 further includes a protective cover plate 240, and the first electrochromic device 221 and the second electrochromic device 222 are both disposed between the lamp shade 230 and the protective cover plate 240.

In the embodiments, the protective cover plate 240 is a colorless device with very high light transmittance, which can protect the electrochromic module 220 and the lamp shade 230 and other structures. Arranging the first electrochromic device 221 and the second electrochromic device 222 between the protective cover plate 240 and the lamp shade 230 may make the light emitted by the flash lamp 200 more uniform and the brightness more concentrated, thereby making the flash lamp 200 better fill light.

In some embodiments, the electrochromic module 220 may be disposed on a surface of the protective cover plate 240, so as to save space. When the electrochromic module 220 is arranged on the surface of the protective cover plate 240, a transparent glue may be applied to bond the electrochromic module 220 and the protective cover plate 240. The transparent glue becomes a transparent adhesive layer 250 after being condensed.

In some embodiments, the first electrochromic device 221, or the second electrochromic device 222, or the first electrochromic device 221 and the second electrochromic device 222 may be disposed between the protective cover plate 240 and the lamp shade 230. The first electrochromic device 221, or the second electrochromic device 222, or the first electrochromic device 221 and the second electrochromic device 222 may be arranged between the protective cover plate 240 and the light-emitting device 210.

Figure 4:
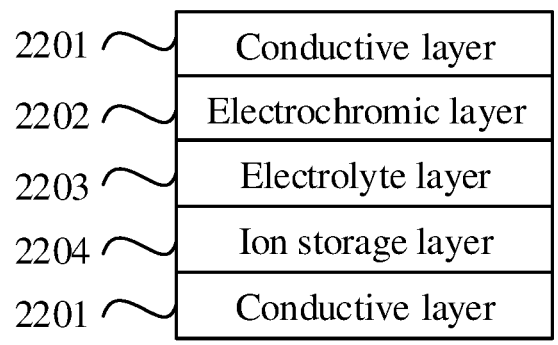
FIG. 4 is a structural schematic view of an electrochromic device according to an embodiment of the present disclosure.

Referring to FIG. 4, in the embodiments, the first electrochromic device 221 may include a first conductive layer, a first electrochromic layer, a first electrolyte layer, a first ion storage layer, and a second conductive layer arranged in sequence. The second electrochromic device 222 may include a third conductive layer, a second electrochromic layer, a second electrolyte layer, a second ion storage layer, and a fourth conductive layer arranged in sequence. That is, each of the first electrochromic device and the second electrochromic device includes the conductive layers 2201 disposed on both sides, and the electrochromic layer 2202, the electrolyte layer 2203, and the ion storage layer 2204 disposed between the conductive layers 2201.

To facilitate understanding, the working principle of the electrochromic device (the first electrochromic device or the second electrochromic device) is described in detail below:

The conductive layer 2201 of the electrochromic device is a transparent layer with good electrical conductivity and optical transparency. A material of the conductive layer 2201 may include indium tin oxide (ITO), and/or tin oxide ($SnO_2$), and/or antimony tin oxide (ATO).

The electrochromic layer 2202 of the electrochromic device is made of an electrochromic material and is a core layer of the electrochromic device, being a layer where the color change reaction occurs. The electrochromic material may be divided into inorganic and organic according to its types; the inorganic material may include tungsten trioxide ($WO_3$) or nickel oxide (NiO), and the organic material may include polythiophenes and their derivatives, violet rosins, tetrasulfur fulvacene, metal phthalocyanines, etc. The electrochromic layer 2202 may be made of one or more of the above-mentioned inorganic materials, or may be made of one or more of the above-mentioned organic materials.

The optical properties (such as reflectance, transmittance, absorptivity, etc.) of electrochromic materials will undergo stable and reversible color changes under an action of an external electric field. Electrochromism appears as a reversible change in the color and transparency of the material. Materials with electrochromic properties can be called electrochromic materials. Devices made of the electrochromic materials can be called electrochromic devices.

The electrolyte layer 2203 of the electrochromic device is made of a special conductive material, which may be a liquid electrolyte material containing a solution such as lithium perchlorate and/or sodium perchlorate, or a solid electrolyte material.

The ion storage layer 2204 of the electrochromic device plays a role of storing charges in the electrochromic device, that is, storing corresponding counter ions when the material of the electrochromic layer 2202 undergoes a redox reaction, thereby ensuring the charge balance of the entire electrochromic device.

Figure 5:
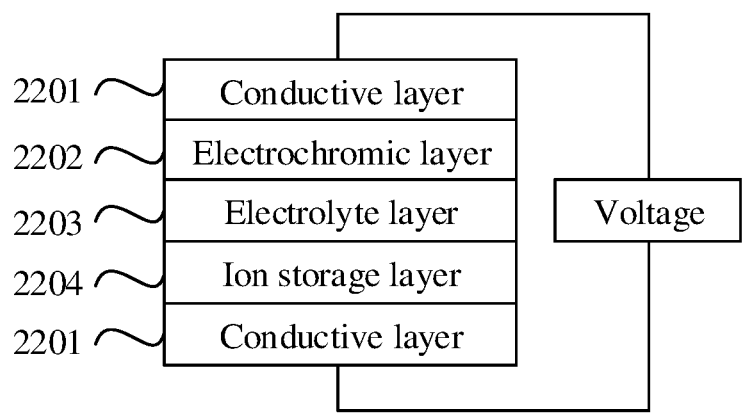
FIG. 5 is a structural schematic view of a working principle of an electrochromic device according to an embodiment of the present disclosure.

Referring to FIG. 5, when a certain voltage is applied between the two transparent conductive layers 2201, the material of the electrochromic layer 2202 undergoes a redox reaction under the action of the voltage, and then the color changes. For example, when the voltage applied between the transparent conductive layer 2201 on both sides of the electrochromic device changes from 0V to 1V, the electrochromic device can change from the transparent color to a set color (the color is determined by the electrochromic layer, which may be designed according to requirements).

In some embodiments, the first conductive layer 2201 of the first electrochromic device 221 is connected to the third conductive layer 2201 of the second electrochromic device 222, the first conductive layer 2201 and the third conductive layer 2201 being connected to a same polarized end of a power source.

In the embodiments, in the first electrochromic device 221 and the second electrochromic device 222, the conductive layers 2201 applied with the same voltage are electrically connected. In this way, the lead structure of the electrochromic module 220 may be simplified.

Figure 6:
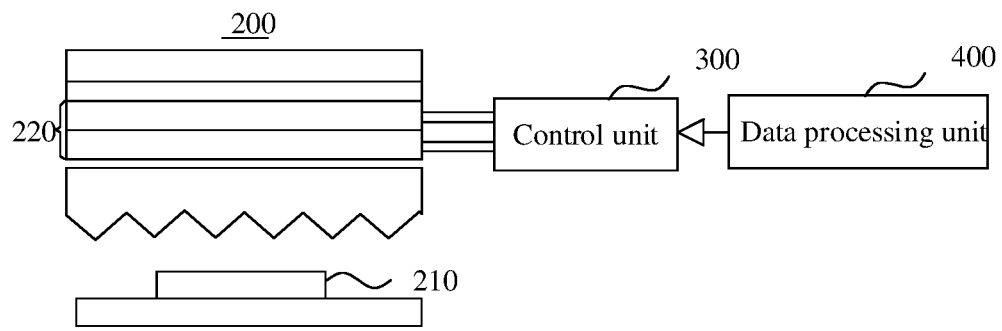
FIG. 6 is a schematic view of an external connection structure of an electrochromic device according to an embodiment of the present disclosure.

In the embodiments, the light-emitting device 210 may be arranged on a circuit board, and wires may be arranged on the circuit board, so as to supply power to the light-emitting device 210. For example, when the flash lamp 200 is arranged on the mobile equipment 100, the circuit board may be an existing circuit board of the mobile equipment 100. Referring to FIG. 6, in the embodiments, the mobile equipment 100 may further include a control unit 300 and a data processing unit 400. The processing unit is connected to the control unit 300 and is configured to send a control instruction to the control unit 300, such that the control unit 300 output a voltage signal. When the flash lamp 200 is arranged on the mobile equipment 100, the control unit 300 and the data processing unit 400 may be implemented by applying existing structures on the mobile equipment 100. During the connection, the control unit 300 is respectively connected to the first electrochromic device 221 and the second electrochromic device 222 to realize individual control of the first electrochromic device 221 and the second electrochromic device 222.

Figure 7:
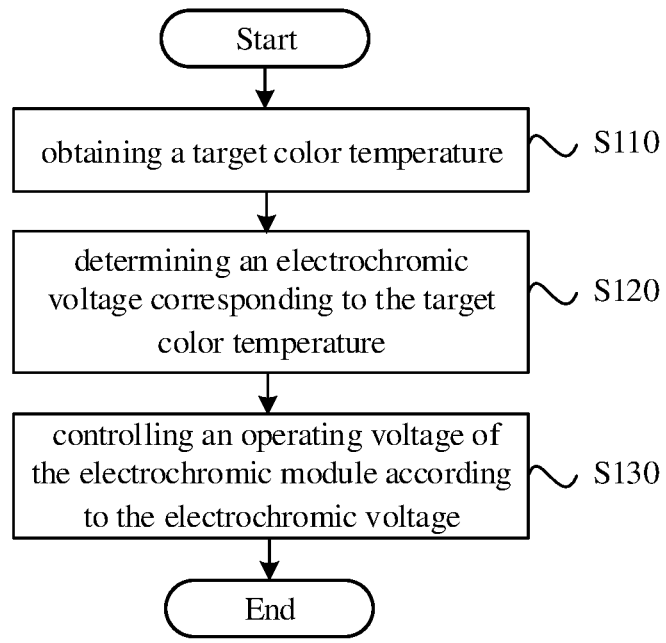
FIG. 7 is a flowchart of a flash lamp control method according to an embodiment of the present disclosure.

Referring to FIG. 7, the present disclosure further provides a method for controlling the flash lamp 200, which is applied to the flash lamp 200 described in any one of the above embodiments. The method includes operations S110 to S130 at blocks illustrated in FIG. 7.

At block S110: obtaining a target color temperature.

In the embodiments, the target color temperature is a desired color temperature of the light emitted by the flash lamp 200. The target color temperature may be artificially set or calculated directly according to the environment where the flash lamp 200 is located. For example, AI may recognize the shooting scene when taking a picture and determines the target color temperature according to the result of the scene recognition.

At block S120: determining an electrochromic voltage corresponding to the target color temperature.

Specifically, according to a corresponding relationship between the color temperature of the flash lamp 200 and the electrochromic voltage of the electrochromic module 220, the electrochromic voltage corresponding to the target color temperature is determined.

In the embodiments, the electrochromic voltage is a voltage corresponding to the electrochromic module 220 under different color changes. That is, the voltage corresponding to different color temperatures.

At block S130: controlling an operating voltage of the electrochromic module 220 according to the electrochromic voltage, such that a color temperature of light emitted by the flash lamp 200 after passing through the electrochromic module 220 tends to the target color temperature.

In the embodiments, since the electrochromic voltage corresponds to a color temperature state, using the electrochromic voltage to control the operating voltage of the electrochromic module 220 may cause the color of the light emitted by the flash lamp 200 to be different, that is, the color temperature of the light emitted by the flash lamp 200 after passing through the electrochromic module 220 tends to the target color temperature. In this way, the operating voltage of the electrochromic module 220 may be directly adjusted to achieve adjusting the color temperature of the flash lamp 200, which greatly simplifies the control process of the flash lamp 200.

In some embodiments, step S110 may include: obtaining an environmental color temperature, and taking the environmental color temperature as the target color temperature.

In the embodiments, the obtaining of the environmental color temperature may be achieved by a color temperature sensor; the color temperature sensor may be such as a camera device of the mobile equipment or may be a sensor individually arranged for specifically detecting color temperature. As for the taking the environmental color temperature as the target color temperature, in a subsequent process, the electrochromic module 220 may be controlled according to the target color temperature, such that the flashing lamp can emit light of which the color temperature is consistent with the color temperature of the environmental light, which enables obtaining an image closer to the actual scene during image taking.

Figure 8:
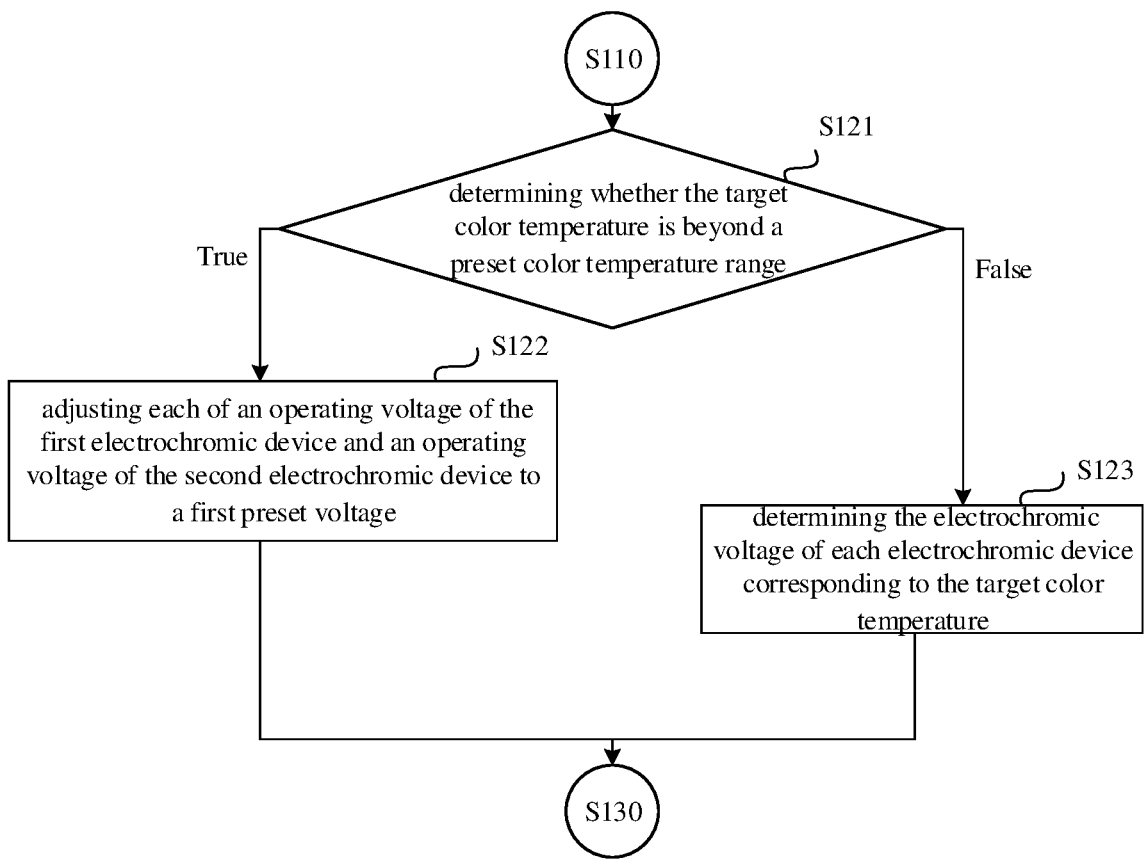
FIG. 8 is a flowchart of a flash lamp control method according to another embodiment of the present disclosure.

Referring to FIG. 8, in some embodiments, the electrochromic module 220 includes a first electrochromic device for adjusting a cold color light and a second electrochromic device for adjusting a warm color light. The step of determining a first electrochromic voltage corresponding to the target color temperature and the first electrochromic device 221 according to the corresponding relationship between the environmental color temperature and the electrochromic module 220 (step S120) includes sub-steps S121-S123 at blocks illustrated in FIG. 8.

At block S121: determining whether the target color temperature is beyond a preset color temperature range.

At block S122: in response to the target color temperature being beyond the preset color temperature range, adjusting each of an operating voltage of the first electrochromic device 221 and an operating voltage of the second electrochromic device 222 to a first preset voltage.

Specifically, the operating voltage of the first electrochromic device 221 and the operating voltage of the second electrochromic device 222 are respectively adjusted to the first preset voltage.

At block S123: in response to the target color temperature being within the preset color temperature range, determining the electrochromic voltage of each electrochromic device corresponding to the target color temperature.

Specifically, from the pre-stored corresponding relationship between the color temperature of the flash lamp 200 and the operating voltages of the first electrochromic device 221 and the second electrochromic device 222, the electrochromic voltage corresponding to the target color temperature for each electrochromic device (first electrochromic device 221 and second electrochromic device 222) is determined.

In the embodiments, the preset color temperature range is set, and the operating voltages of the first electrochromic device 221 and the second electrochromic device 222 corresponding to the target color temperature outside the preset color temperature range are set to the first preset voltage. In this way, the electrochromic devices in the electrochromic module 220 may be protected, preventing the applied voltage from being too high.

For example, some special environments (such as a completely black scene, or an overexposed scene) may cause (a color temperature sensor, etc.) to fail to obtain an accurate color temperature value, or to obtain a value that exceeds an upper or lower limit. In these scenes, there will be a mismatch between the actual color temperature value and color temperature data in a lookup table. In this case, the proposed solution may default to the electrochromic module 220 not working and the output voltage of the corresponding control unit 300 is 0V.

In some embodiments, from the pre-stored corresponding relationship between the color temperature of the flash lamp 200 and the operating voltages of the first electrochromic device 221 and the second electrochromic device 222, the step of determining the electrochromic voltage of each electrochromic device corresponding to the target color temperature (step S123) includes: determining a first electrochromic voltage corresponding to the target color temperature and the first electrochromic device 221 according to the corresponding relationship between the color temperature of the flash lamp 200 and the electrochromic module 220; determining a second electrochromic voltage corresponding to the target color temperature and the second electrochromic device 222 according to the corresponding relationship between the color temperature of the flash lamp 200 and the electrochromic module 220.

Figure 9:
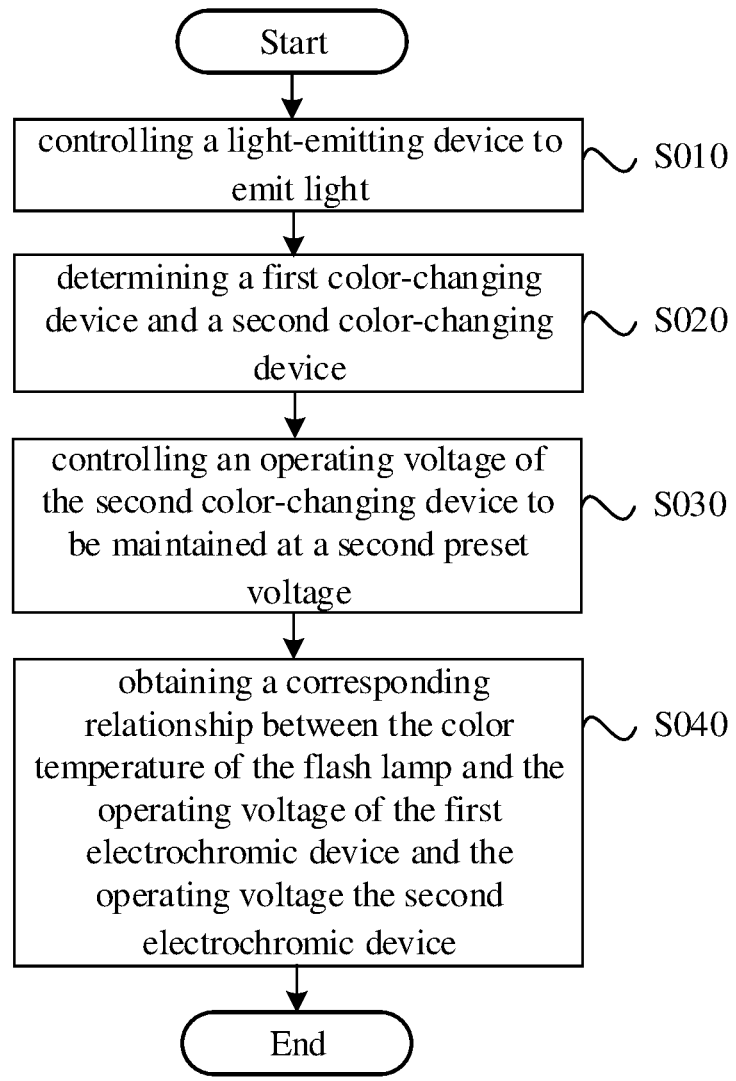
FIG. 9 is a flowchart of a flash lamp control method according to further another embodiment of the present disclosure.

Referring to FIG. 9, in some embodiments, the method further includes steps S010-S040 at blocks illustrated herein.

At block S010: controlling a light-emitting device 210 to emit light.

At block S020: determining a first color-changing device and a second color-changing device.

Specifically, the first electrochromic device 221 and the second electrochromic device 222 are configured as the first color-changing device in sequence, and an electrochromic device other than the first color-changing device is configured as the second color-changing device.

At block S030: controlling an operating voltage of the second color-changing device to be maintained at a second preset voltage.

At block S040: obtaining a corresponding relationship between the color temperature of the flash lamp 200 and the operating voltage of the first electrochromic device 221 and the operating voltage the second electrochromic device 222. The operating voltage of the first color-changing device is gradually increased according to the preset voltage difference within the preset voltage range, and the color temperature of the flash lamp 200 corresponding to each operating voltage is stored to obtain the corresponding relationship between the color temperature of the flash lamp 200 and the operating voltage of the first electrochromic device 221 and the operating voltage the second electrochromic device 222.

It should be noted that after step S010 and before step S020, the color temperature of the flash lamp 200 may be measured without applying voltage to the electrochromic module 220.

In the embodiments, the corresponding relationship between the various color temperatures of the light emitted by the flash lamp 200 and each electrochromic device in the electrochromic module 220 may be determined according to the structure in the electrochromic module 220. In this way, after obtaining the relationship between the color temperature of the flash lamp 200 and each electrochromic device in advance, the electrochromic voltage of each electrochromic device may be directly obtained according to this relationship.

In the embodiments, the corresponding relationship between the color temperature of the flash lamp 200 and the operating voltages of the first electrochromic device 221 and the second electrochromic device 222 indicates, for each color temperature of the flash lamp 200, a corresponding combination of the actual operating voltages of the first electrochromic device 221 and the second electrochromic device 222.

The present disclosure further provides a mobile equipment 100, which includes an image obtaining device and the flash lamp 200 according to any one of the above-mentioned embodiments.

In the embodiments, setting the flash lamp 200 on the mobile equipment 100 may make the process of controlling the flash lamp 200 easier when the mobile equipment 100 is applied to capture images.

In some embodiments, the mobile equipment 100 further includes a processor and a memory. The memory stores an executable program. When the processor executes the executable program, the methods described in the above-mentioned embodiments may be achieved. The processor may include the data processing unit 400 and the control unit 300.

The above are only various embodiments of the present disclosure, but the scope of the present disclosure is not limited thereto. Those skilled in the art can easily think of variations or substitutions within the technical scope disclosed in the present disclosure, which should be covered by the scope of the present disclosure. Therefore, the scope of the present disclosure shall be subject to the scope of the claims.

What is claimed is:

1. A flash lamp, comprising: a light-emitting device and an electrochromic module disposed on the light-emitting device; wherein a color of the electrochromic module is different under different operating voltages, such that a color temperature of light is different, the light being emitted by the light-emitting device and passing through the electrochromic module;
wherein the electrochromic module comprises a first electrochromic device configured to adjust a cold color light and a second electrochromic device configured to adjust a warm color light; the first electrochromic device and the second electrochromic device are sequentially arranged on the light-emitting device; the first electrochromic device comprises a first conductive layer, a first electrochromic layer, a first electrolyte layer, a first ion storage layer, and a second conductive layer arranged in sequence; the second electrochromic device comprises a third conductive layer, a second electrochromic layer, a second electrolyte layer, a second ion storage layer, and a fourth conductive layer arranged in sequence.

2. The flash lamp according to claim 1, further comprising a lamp shade, wherein the lamp shade is arranged between the electrochromic module and the light-emitting device.

3. The flash lamp according to claim 2, further comprising a protective cover plate; wherein the first electrochromic device and the second electrochromic device are both disposed between the lamp shade and the protective cover plate.

4. The flash lamp according to claim 3, wherein the first conductive layer is connected to the third conductive layer, the first conductive layer and the third conductive layer being connected to a same polarized end of a power source.

5. The flash lamp according to claim 2, wherein a side of the lamp shade close to the light-emitting device is arranged with a pattern to form a Fresnel lens.

6. A method for controlling a flash lamp; wherein the flash lamp comprises: a light-emitting device and an electrochromic module disposed on the light-emitting device; a color of the electrochromic module is different under different operating voltages, such that a color temperature of light is different, the light being emitted by the light-emitting device and passing through the electrochromic module; the method comprising:
obtaining a target color temperature;
determining a target electrochromic voltage corresponding to the target color temperature according to a corresponding relationship between the color temperature of the light and an electrochromic voltage of the electrochromic module; and
controlling an operating voltage of the electrochromic module according to the target electrochromic voltage, such that the color temperature of the light tends to the target color temperature;
wherein the electrochromic module comprises a first electrochromic device configured to adjust a cold color light and a second electrochromic device configured to adjust a warm color light; the first electrochromic device and the second electrochromic device are sequentially arranged on the light-emitting device;
the first electrochromic device comprises a first conductive layer, a first electrochromic layer, a first electrolyte layer, a first ion storage layer, and a second conductive layer arranged in sequence; the second electrochromic device comprises a third conductive layer, a second electrochromic layer, a second electrolyte layer, a second ion storage layer, and a fourth conductive layer arranged in sequence.

7. The method according to claim 6, wherein the flash lamp further comprises a lamp shade, and the lamp shade is arranged between the electrochromic module and the light-emitting device.

8. The method according to claim 7, wherein the flash lamp further comprises a protective cover plate; the first electrochromic device and the second electrochromic device are both disposed between the lamp shade and the protective cover plate.

9. The method according to claim 8, wherein the first conductive layer is connected to the third conductive layer, the first conductive layer and the third conductive layer being connected to a same polarized end of a power source.

10. The method according to claim 7, wherein a side of the lamp shade close to the light-emitting device is arranged with a pattern.

11. The method according to claim 6, wherein the electrochromic module comprises a first electrochromic device configured to adjust a cold color light and a second electrochromic device configured to adjust a warm color light; the determining a target electrochromic voltage corresponding to the target color temperature according to a corresponding relationship between the color temperature of the light and an electrochromic voltage of the electrochromic module comprises:
in response to the target color temperature being beyond a preset color temperature range, adjusting each of an operating voltage of the first electrochromic device and an operating voltage of the second electrochromic device to a first preset voltage; and
in response to the target color temperature being within the preset color temperature range, determining the electrochromic voltage of each electrochromic device corresponding to the target color temperature according to a pre-stored corresponding relationship between the color temperature of the light and the operating voltage of the first electrochromic device and the operating voltage of the second electrochromic device.

12. The method according to claim 11, wherein the determining the electrochromic voltage of each electrochromic device corresponding to the target color temperature according to a pre-stored corresponding relationship between the color temperature of the light and the operating voltage of the first electrochromic device and the operating voltage of the second electrochromic device comprises:

determining a first electrochromic voltage corresponding to the target color temperature and the first electrochromic device according to the corresponding relationship between the color temperature of the light and the electrochromic voltage of the electrochromic module; and determining a second electrochromic voltage corresponding to the target color temperature and the second electrochromic device according to the corresponding relationship between the color temperature of the light and the electrochromic voltage of the electrochromic module.

13. The method according to claim 11, further comprising:

controlling the light-emitting device to emit light;

taking the first electrochromic device and the second electrochromic device as a first color-changing device in sequence, and taking an electrochromic device other than the first color-changing device as a second color-changing device;

controlling an operating voltage of the second color-changing device to be maintained at a second preset voltage; and gradually increasing an operating voltage of the first color-changing device according to a preset voltage difference within a preset voltage range, storing the color temperature of the light, emitted by the light-emitting device and passing through the electrochromic module, corresponding to each operating voltage, and obtaining the corresponding relationship between the color temperature of the light emitted by the light-emitting device and passing through the electrochromic module and the operating voltage of the first electrochromic device and the operating voltage the second electrochromic device.

14. An electronic equipment, comprising an image obtaining device and a flash lamp wherein the flash lamp comprises: a light-emitting device and an electrochromic module disposed on the light-emitting device; a color of the electrochromic module is different under different operating voltages, such that a color temperature of light is different, the light being emitted by the light-emitting device and passing through the electrochromic module;

wherein the electrochromic module comprises a first electrochromic device configured to adjust a cold color light and a second electrochromic device configured to adjust a warm color light; the first electrochromic device and the second electrochromic device are sequentially arranged on the light-emitting device;

the first electrochromic device comprises a first conductive layer, a first electrochromic layer, a first electrolyte layer, a first ion storage layer, and a second conductive layer arranged in sequence; the second electrochromic device comprises a third conductive layer, a second electrochromic layer, a second electrolyte layer, a second ion storage layer, and a fourth conductive layer arranged in sequence.

15. The electronic equipment according to claim 14, wherein the flash lamp further comprises a lamp shade, and the lamp shade is arranged between the electrochromic module and the light-emitting device.

16. The electronic equipment according to claim 15, wherein the flash lamp further comprises a protective cover plate; the first electrochromic device and the second electrochromic device are both disposed between the lamp shade and the protective cover plate.

17. The electronic equipment according to claim 16, wherein the first conductive layer is connected to the third conductive layer, the first conductive layer and the third conductive layer being connected to a same polarized end of a power source.

\* \* \* \* \*